July 1, 1941.   P. F. COLLINS   2,247,573
DENTAL INVESTMENT COMPOSITION
Filed April 8, 1941
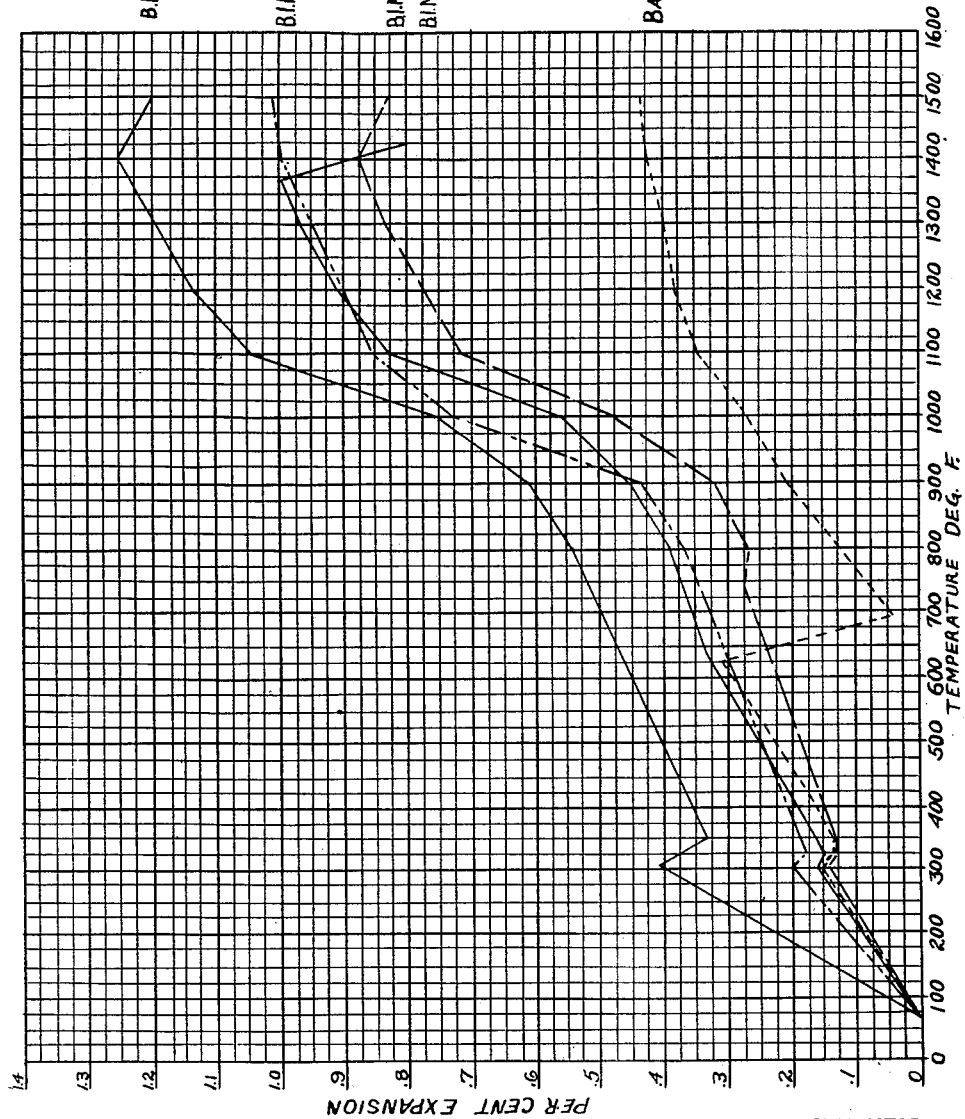
INVENTOR.
PAUL FRANCIS COLLINS
BY
Attorney Patented July 1, 1941

2,247,573

UNITED STATES PATENT OFFICE 2,247,573

DENTAL INVESTMENT COMPOSITION

Paul Francis Collins, Columbus, Ohio, assignor, by mesne assignments, to Edmund A. Steinbock, Louisville, Ky.

Application April 8, 1941, Serial No. 387,482

2 Claims. (Cl. 22—188)

My invention relates to a dental investment composition and process of using the same. The composition is designed for use either in the formation of a mold or in the holding of metal pieces together during soldering. It is particularly advantageous in those casting operations wherein a metal or alloy thereof is embedded in a mold formed of the composition and metal cast thereagainst, though it is highly advantageous in the making of castings, such as inlays, plates and the like and, as indicated above, in soldering operations. It also can be used for other casting processes.

In the prior art it has been customary to use dental investment compositions whose chief ingredients are 35 per cent to 80 per cent siliceous refractory materials, such as silica, cristobalite and the like, and 19 per cent to 55 per cent a calcium sulfate binder, such as plaster of Paris or the like. In addition to these ingredients, other materials, such as boric acid, graphite, asbestos fiber, pumice stone, coloring matter, et cetera, which are usually present in amounts substantially less than 15 per cent.

Most of the prior art, dental investment compounds, have possessed some serious drawbacks. One of the common drawbacks has resulted from the general practice of so making the compound that it will not have sufficient total expansion in use to compensate for the shrinkage of the metal cast. In this respect the National Bureau of Standards has reported the average contraction of dental gold casting alloys as 1.25 per cent when congealing, (from liquid to solid state). It has been difficult to compound ingredients of dental investments, particularly the two chief ingredients, such as silica and plaster of Paris, so that they will expand satisfactorily to offset this natural metal shrinkage. The siliceous material normally used expands in a more or less linear fashion with an increase in temperature, but a more or less sharp rise in thermal expansion occurs in the neighborhood of 800°-1000° F. However, the calcium sulfate binders customarily used undergo a more or less linear, straight-line expansion until a temperature approximating 300° F. is reached, at which temperature the mechanically combined water is driven off, with a consequent slight contraction. Following this slight contraction, expansion continues until that temperature is reached at which the first portion of the water of crystallization begins to be driven off from the gypsum. This is in the neighborhood of 560°-600° F. At approximately these temperatures, the calcium sulfate binder begins to shrink, and continues to a more or less degree as higher temperatures are attained. During this period, the calcium sulfate has what may be called a negative expansion. This can be demonstrated by the heating of a specimen formed of calcium sulfate to 700°-800° F., at which time it will be shorter than its original length. At higher temperatures, this contraction becomes greater and greater.

The net result of this is that a dental investment compound formed of a siliceous refractory material and a calcium sulfate binder will, in the absence of any counteracting ingredients, fail to show a linear straight line expansion throughout the normal heating operations to which these compounds are subjected in present day practice. For example, a mixture composed of 40 per cent plaster of Paris and 60 per cent silica will show a drop of its expansion curve within the temperature range of 500°-900° F., due to the prevalence of the shrinkage effects of calcium sulfate. This drop is a substantial one and may even go below the zero line, though it may stop slightly above such line. On the other hand, with a mixture composed of 80 per cent silica and 15 per cent calcium sulfate, which will however produce an undesirably soft mold, there is practically no drop within this temperature range of 500°-900° F., which indicates the dominance of the thermal expansion of the silica. Thus, it can be seen that there is a wide variation in thermal expansion, not only in ultimate thermal expansion but in the degree of drop between the temperature ranges indicated.

The equipment available for burning-out and heat soaking in the various dental laboratories today is of rather inefficient design and it is not at all unusual to find a difference in temperature of 400° F., in different parts of a given mold undergoing heat-treatment. This is due partly to the refractory nature of the mixture, to its poor heat conductivity and to the said commonly found inefficiency of design of the heating units.

With such a drop in the thermal expansion curve of the mold material and with such a variation in temperature in different parts of the mold material as 400° F., or less, it can be readily understood that certain parts of the mold might be reasonably expected to be expanding while other parts are contracting and vice versa. In any event, these combined conditions result in the setting up of strains within the mold and this in turn frequently results in cracks in the mold which are reproduced as fins in the casting gold as well as in the production of distorted castings.

As indicated above, the said undesirable drop in the thermal expansion curve might be prevented by using a formula of substantially higher silica content, such as 85 per cent silica and 15 per cent of plaster of Paris. Such a mixture, however, is extremely soft and would meet with serious objections from dental technicians. If, on the other hand, it is attempted to reduce the silica content with a consequent increase in the plaster of Paris content to the point where sufficient hardness is possessed by the mixture to meet the requirements of the dental technician, this will result in a reduction of the thermal expansion of the mixture to some such percentage of 0.6 per cent to 0.7 per cent and even as low as 0.4 per cent, and, of course, the increase in the plaster of Paris content greatly accentuates the marked contraction within the temperature range of 500°–900° F.

Let it be understood that in the dental art where precious metals are commonly used the thermal expansion percentage referred to immediately above should be relatively high, for example, about 0.9 per cent to 1.0 per cent, so that when this is added to the average setting expansion (which is common in such compounds) of from 0.25 per cent to 0.3 per cent the total expansion will substantially equal the 1.25 per cent reported by the National Bureau of Standards. However, even in the dental art and in other arts where precision casting methods are desirable, a total expansion of as much as 1.60 per cent may be desirable, without regard to the proportion between the thermal expansion and the setting expansion.

Some attempt has been made to overcome this drop in the thermal expansion curve by the addition of a third material. However, such of these attempts as I am familiar with, result in other drawbacks of a more or less serious nature.

For example, one of these attempts has involved the addition of boric acid to an investment composition of silica and plaster of Paris. It was claimed that the addition of boric acid eliminate the above-described large contraction in the thermal expansion curve and made it possible to obtain a thermal expansion as high as 0.90 per cent. However, the attainment of this result, calls for the use of such a high percentage of boric acid as to seriously impair other desirable and requisite physical properties, such as porosity and setting expansion. These impairments are so serious that it has been found necessary or desirable to use only sufficient boric acid to give a thermal expansion curve within the aforenamed temperature range which, though not so severe, is nevertheless undesirable.

Another attempt has involved the addition of a third ingredient such as sodium chloride to a compound embodying silica and plaster of Paris. However, though sodium chloride is desirable in some compositions, in others it has the drawback of unduly hastening the setting of the calcium sulfate binder. Thus in a composition embodying a standard calcium sulfate binder the setting is unduly hastened, by the inclusion of sodium chloride, to such an extent that in dental investments it is usually necessary to introduce considerable amounts of a retarding agent to delay setting and to maintain the most desirable setting time. Retarding agents, though usually present to some degree, are undesirable since they commonly promote "aging" of the calcium sulfate binder. By "aging" is meant that alteration, with lapse of time, of a composition of this type which causes it to set more slowly when it is ultimately used, such alteration being in setting time and/or in setting expansion and/or in thermal expansion, and such alteration being in the nature of an increase or decrease of one or more of these factors, so that after "aging," the properties of the investment composition are not entirely predictable. Because of this tendency, it is desirable that the amount of retarding agent used be kept to the lowest possible minimum. In fact, the effect of these retarders is to so alter the composition, with lapse of time, that upon use, the setting time is prolonged and, the setting expansion of the calcium sulfate binder is altered. This effect, in turn, alters the physical properties of the resultant investment compound and, consequently, of the mold produced therefrom.

One of the objects of my present invention is to provide a dental investment compound wherein a refractory material, which may be silica or other material, and a calcium sulfate binder are used, with these materials being so proportioned that the composition will have a relatively high degree of thermal expansion accompanied by a degree of hardness satisfactory to the dental technician, while the thermal expansion curve will be substantially a linear straight line curve.

Another object of this invention is to provide a dental investment compound embodying a refractory material and a calcium sulfate binder but embodying at least one other ingredient which will be effective to prevent any material drop in the thermal expansion curve, without materially possessing the above-described drawbacks of prior art investment compounds.

Another object of this invention is to provide a dental investment compound embodying a refractory material and a calcium sulfate binder wherein the danger of distortion and cracking of the mold during heating thereof will be minimized.

Another object of this invention is to provide a method of producing metal castings which will render possible the attainment of a relatively high degree of thermal expansion with substantial freedom from distortion of the mold and with consequent attainment of more precisely fitting castings.

This application is a continuation in part of my application, Serial No. 54,937, filed December 17, 1935, for Dental investment composition and process of using the same.

My invention has to do with an investment compound, wherein the primary ingredients are a refractory material and a binder. In preferred form these primary ingredients are silica and calcium sulfate. I desirably have the refractory material present in percentages ranging from 35 per cent to 80 per cent when silica is used, and the calcium sulfate present in percentages ranging from 19 per cent to 55 per cent when a plaster of Paris is used. In addition to these ingredients, other materials, such as graphite, asbestos fiber, pumice stone, and coloring matter, in quantities up to 15 per cent may be used, together with certain chlorides in percentages to be subsequently set forth.

In one embodiment, my invention contemplates the provision of a dental investment compound embodying a refractory material and a calcium sulfate binder, together with zinc chloride in proportions ranging from .1 per cent to 3.5 per cent of the dry investment composition, the exact percentage depending upon the percentage of the refractory material and the calcium sulfate binder, as well as the specific form of these constituents which may be used. I have also found, by actual tests, that copper chloride or cobalt chloride, may be used in substantially the same percentages as substitutes for the zinc chloride, being more or less desirable in accordance with the order in which they are named.

In this connection, attention may be called to my Patent No. 2,006,733, dated July 2, 1935, which has to do primarily with a dental investment compound embodying a siliceous refractory material and a calcium sulfate binder, together with a protective reagent such as copper or other metal, designed to react with the sulfur liberated from the calcium sulfate binder so as to prevent injury to the precious metal or precious metal insets embedded in the investment composition. This patent speaks of the use of chlorides as alternative protective reagents, and specifically mentions strontium chloride. However, it should be noted that the chlorides mentioned in this patent are mentioned only as being suitable, in some degree, as protective reagents for the purpose of reacting with the sulfur gases liberated from the calcium sulfate to prevent injury to the cast precious metal or the precious metal insets.

It may further be pointed out that this patent specifies that the metal protective reagent may constitute from 0.5 per cent up to 40 per cent of the entire investment composition, though it is recommended that the protective reagent be used in excess of 5 per cent and not over 25 per cent of the entire composition, for giving most satisfactory results. In Example 1 of this patent, the protective reagent is set forth as "13 per cent of a mixture of equal parts of finely powdered metallic nickel and finely powdered metallic copper."

If it is desired that the protective reagent be copper alone, the amount approximating 10 per cent of the total composition, which is otherwise mainly formed of a refractory material, and a calcium sulfate binder, shown by tests to be a practicable and effective dental investment composition, the replacement of this copper by copper chloride would require that the copper chloride be initially present in an amount approximately 22 per cent of the total composition. However, though the amount of copper present in this copper chloride will form an effective agent for the protection of the cast precious metal and the precious metal insets in the mold, the use of copper chloride in amount constituting approximately 22 per cent of the entire composition, though satisfactory in such arts as jewelry manufacturing, ornamental casting, et cetera, results in certain important draw-backs in the art of dental casting which will now appear.

For example, it must be realized that the use of 22 per cent of the copper chloride, instead of 10 per cent of pure copper, necessitates the reduction of the combined refractory and calcium sulfate contents from 90 per cent to 78 per cent. Since, in the art of dental casting, the refractory is relied upon as an important factor in the attainment of adequate thermal expansion, and the calcium sulfate is relied upon for the attainment of the additive setting expansion, this reduction in the combined percentages of these materials results in a serious decrease in the expansion qualities of the investment composition. Since the refractory material is normally present in considerably larger percentages, the material decrease in quantity thereof seriously detracts from the thermal expansion qualities of the investment as a whole. In addition, my tests have shown that large amounts of chloride seriously detract from the rapid setting qualities demanded in the art of dental casting and seriously detract from the hardness required in the mold, particularly when it is to be used for dental investment work.

Casual consideration might indicate that the loss of total expansion qualities of the composition, by the use of approximately 22 per cent of copper chloride, would be offset by the tendency of the copper chloride itself to improve expansion qualities. Actual tests, however, establish conclusively that this is not the case. On the contrary, it has been found that copper chloride and the other chlorides which form a part of this invention are effective to improve thermal expansion properties up to a certain point only. In other words, up to 3.5 per cent, they are effective to improve thermal expansion properties. Beyond 3.5 per cent, they do not materially improve thermal expansion properties and, as a matter of fact, if these chlorides are used much in excess of 3.5 per cent they tend to unduly soften the compositions after setting. In percentages approaching 22 per cent they not only seriously decrease thermal expansion properties but they make the compositions so soft after setting as to render them impractical for dental investment service.

Thus, it will be seen that, although my above-mentioned prior patent suggests the use of a chloride as a protective reagent, in conjunction with refractory material and calcium sulfate, it does not teach the use of such limited amounts of the chloride as would be effective to improve the thermal expansion properties of the investment composition.

In another embodiment of my invention, I utilize a refractory material, a calcium sulfate binder, copper or one of the other pure metals described in my Patent 2,006,733 of July 2, 1935, which serves as a protective reagent, and either zinc chloride or one of the other equivalent materials described above, in the percentages indicated, as desirable for improvement of thermal expansion. The protective reagent will either reduce materially the formation of sulfur gases, or react with such gases in preference to the embedded or cast metals, and will combine with any oxygen present in the mold, to prevent such oxygen from attacking the embedded or cast metals. Also, as stated, the above-stated percentages of the zinc chloride, or other equivalent material, will improve the thermal expansion qualities.

In such an embodiment of my invention, the amount of the protective reagent can vary. Where pure metal is used, the quantities ordinarily range between 5 per cent and 25 per cent, though preferably between 7 per cent and 15 per cent is used. However, when such percentages of pure metals are used, it will be realized that the refractory material and the calcium sulfate must be reduced proportionately. This in turn reduces the thermal expansion qualities of the resultant composition. However, the chlorides which I have mentioned above, are effective to supplement the expansion qualities imparted by the refractory material and to offset a loss of thermal expansion.

As a matter of fact, the use of such chlorides as zinc chloride, cobaltic chloride, and copper chloride either in composition which contain the protective reagent, or in compositions which do not contain the protective reagent, does more than supplement the thermal expansion qualities of the refractory material. Another effect on the composition is to eliminate the drop in expansion and is the attainment of a maximum thermal expansion with a linear straight line expansion curve.

Where I utilize a protective reagent such as copper or the like, I have found that there is some tendency towards oxidation of the protective reagent. To offset this, I have provided what may be termed a "protective constituent" to protect the copper or other protective reagent against oxidation. Thus, it is within the scope of my invention to provide a dental investment composition containing a refrecatory material, a calcium sulfate binder, a protective constituent and a material for improving the expansion qualities of the investment material as a whole taken from the group consisting of zinc chloride, copper chloride and cobaltic chloride.

The chlorides listed herein do not unduly accelerate the setting of the calcium sulfate binder, as does the sodium chloride mentioned above. All of the metal chlorides listed herein, as falling within my invention are chlorides of polyvalent metals, (i. e. metals having, in the "ic" chlorides, a valence above 1) whereas the sodium of sodium chloride is a monovalent metal.

In the last described embodiment of my invention, I have utilized what I term a "protective constituent" for the said protective reagent. In its preferred form this protective constituent is preferably a calcium carbonate. For example, of the number of pure metals which I have found to satisfactorily combine with, or otherwise prevent the harmful effects of sulfur or sulfur gases, copper appears among the most practical when all factors are taken into consideration. The calcium carbonate protects the copper or other protective reagent against oxidation.

As long as such a compound embodying copper or like protective reagents is used in connection with a gas or gas-air oven for burning-out and heat soaking invested work, no difficulties are experienced. The atmosphere surrounding the mold and the invested work is substantially reducing at all times. However, where electric furnaces are used for burning-out and heat-soaking invested cases the atmosphere is principally neutral or tends to be slightly oxidizing. There are a few brief moments in burning-out in the electric furnace during which the wax is being eliminated from the mold, in which the atmosphere in the interior of the mold itself may be reducing in character. Therefore, in heating a mold in an atmosphere such as the one last described above from room temperature to some temperature between 1200° and 1600° F., it can be readily understood that the finely divided copper which has been incorporated in the investment composition will be strongly oxidized, probably before a red heat (1000°–1100° F.) has been reached. This tends to decrease the activity of this reagent in absorbing the harmful sulfur gases which will be liberated principally between the temperatures of 1200°–1600° F.

While my prior Patent No. 2,006,733 states that the metals (e. g. copper) can be used in the condition of pure metal, metal oxide, alloys rich in copper, sulfur-free copper salts such as nitrates, etc., as protective reagents, the pure metals in a finely divided state are generally more active, i. e., they combine more promptly and more avidly with the reduced sulfur compounds than does the oxide, and hence are preferred. Accordingly where the metals (e. g. copper) are used in the metallic state, it is advisable to keep them in said state and thereby to retain their full activity. This is accomplished by means of my "protective constituent," such as calcium carbonate, lamp black or equivalent.

Apparently, the copper having a high affinity for oxygen will take up the oxygen and thereby become less active in combining with sulfur. When temperatures are reached where appreciable quantities or sulfur gases are being liberated, e. g. 1200° to 1600° F. this protective reagent may otherwise be seriously reduced in activity so that its absorption of sulfur will be materially reduced or retarded. Thus, to prevent the occurrence of this undesirable condition I have introduced calcium carbonate into such a composition as a protective constituent of the copper or other equivalent protective reagent. The calcium carbonate decomposes at the higher temperatures involved and liberates carbon dioxide, which functions to prevent undue oxidation, so that the life of the metallic powder within the investment formula is prolonged.

The use of this calcium carbonate in the manner indicated should be distinguished from the prior art use of such materials as marble dust, wherein this marble dust was used as a refractory substance in these early investment compositions. These prior art compositions which utilized marble dust were mainly employed in such operations as soldering wherein the temperatures of the investment as a whole ordinarily did not exceed 800° to 1000° F. and wherein it was only necessary to be sure that the mold be thoroughly dried out before attempting the soldering operation. Under such conditions, it was safe to use the marble dust as the refractory ingredient, even in the relatively high percentages necessary for such a function.

However, when casting was introduced, more particularly the prevalent high-heat casting technique involving the burning-out and heat soaking at temperatures of 1200°–1600° F., such mixtures as those involving the high percentage of marble dust necessary to enable it to serve as a refractory would be impracticable, since calcium carbonate begins to undergo a decomposition into calcium oxide and carbon dioxide at around 1300° F. to 1500° F. Furthermore, when the requirements of the present day practice of precision casting are considered, it would be impracticable to use large percentages of a substance of this nature, since it would not have the high thermal expansion properties required as a factor in compensating for the shrinkage of the cast metal. As a matter of fact, the decomposition which would occur would, in all probability, bring about undesirable contraction of the mold mixture as it approached the higher limits of burning-out, such as 1500° F. or above.

Thus, it should be understood that my calcium carbonate constituent is introduced for the protection of the protective reagent. Moreover, it is desirable that it not be used in excess of 10 per cent by weight of the total investment compound. I prefer that it be used in percentages ranging from .1 to 5.0 per cent by weight of the total investment compound. Larger amounts, such as 20 per cent would protect the copper, but would reduce thermal expansion, and cause other troubles.

It will be understood that other constituents may be used as a substitute for the calcium carbonate in the composition just described. Thus, I may use lamp black, bone black, or graphite either alone or in combination with each other, or in combination together or individually with calcium carbonate. In place of the lamp black I can also use wood finely powdered or charcoal, although it is to be noted that such a material absorbs considerable water and the amount of water to be used in mixing up the investment paste would have to be somewhat increased. Wood flour or similar carbohydrate material could also be employed but somewhat more water would be needed. Lithium carbonate would function similarly to calcium carbonate. Accordingly, the use of these materials is intended to be covered in the claims. The total percentage of carbon can range from 0.1 to 1.0 per cent.

Though I have described the use of calcium carbonate or an equivalent substance in a compound embodying a refractory material, a calcium sulfate binder, zinc chloride and other specified chlorides and a protective reagent, it will be understood that it may be used in a compound wherein the chlorides are omitted, as set forth in the application of which this is a continuation.

In the performance of my method I preferably take any one of the above described compounds and, by the addition of moisture thereto, place it in such a condition that it may be molded about a wax pattern formed in any customary or desirable manner, leaving a sprue hole into the cavity containing the wax. After the setting of the mold thus formed, the temperature thereof is gradually raised until it reaches the casting temperatures. During the course of this increase in temperature, the wax pattern is melted and dissipated and the casting operation may then be performed in any approved manner.

Where casting against embedded metal is to be effected I affix the wax pattern to the metal and then mold the plastic compound about such embedded metal and wax pattern in any customary or desirable manner, leaving a sprue hole into the cavity containing the wax. After the setting of the mold thus formed the temperature thereof is gradually raised until it reaches the proper casting temperature. During the course of this increase in temperature the wax pattern is melted and dissipated and the casting operation may then be performed. In making dental castings it is common to use precious metals, e. g. gold and alloys of gold and of other precious metals. The term "dental metal" is intended to cover the metals in a pure state as well as alloys thereof such as are commonly used and/or suitable for the purpose.

In that form of my compound embodying a refractory material, a calcium sulfate binder and one of the chlorides specified, the thermal expansion curve will be a more or less linear straight line curve which is free from any substantial drop and which is substantially regular at all sections thereof. In particular, it will be noted that the drop in expansion curve within the temperature range of 500° to 900° F., commonly occurring in most prior art compounds under similar operating conditions will have been eliminated. In that form of my compound which embodies the protective reagent, the same advantageous results will be found to exist and, in addition, any em-
bedded or cast metal will be found to have superior physical properties due to their protection against corrosion and oxidation. In those compounds embodying the further additional elements of calciumcarbonate or equivalent, a still further improvement will be noted in the physical properties of the embedded or cast metal.

In the annexed drawing I have shown the effects of the addition of the above mentioned chlorides as agents for controlling thermal expansion. In this drawing, the graph designated "Basic investment mix" shows the thermal behavior of a particular investment compound within the scope of my prior Patent 2,006,733, and containing silica, calcium sulfate binder, and metallic copper, with no chlorides added. The graph designated "zinc chloride" shows the thermal behavior of that same basic investment mix, with 1.25 per cent strontium chloride added. All the remaining graphs show the thermal behavior of this same basic investment mix, with 1.25 per cent of the respective chlorides added. I have also included the graph on barium chloride (covered in my copending case 54,937) for comparison.

It will be noted that the severe drop encountered in the basic investment mix at a temperature of around 800° F., is completely eliminated, by the addition of chlorides, and that the expansion takes place more nearly on a continuous straight ascending line. Moreover, with 1.25 per cent of these chlorides, I obtain a degree of thermal expansion, ranging from two to three times that of the "basic investment mix."

The following specific formulas are given for the purpose of illustration, but without in any sense limiting the scope of the invention to these specific formulas. In these formula equivalents, as stated above, can be substituted. Two sets of proportions will be given with each set of constituents.

|  | $m$ | $n$ |
| --- | --- | --- |
| Silica | 73.5 | 53.0 |
| Calcium sulfate binder | 26.0 | 45.0 |
| Zinc chloride | .5 | 2.0 |

|  | $o$ | $p$ |
| --- | --- | --- |
| Silica | 65.5 | 45.5 |
| Calcium sulfate binder | 26.0 | 40.0 |
| Metallic copper | 8.0 | 12.5 |
| Zinc chloride | .5 | 2.0 |

|  | $q$ | $r$ |
| --- | --- | --- |
| Silica | 60.5 | 46.0 |
| Calcium sulfate binder | 26.0 | 30.0 |
| Metallic copper | 8.0 | 12.0 |
| Calcium carbonate | 5.0 | 10.0 |
| Zinc chloride | 0.5 | 2.0 |

Though the above description of my invention deals particularly with the use of the various chlorides listed, in connection with compositions wherein the refractory material is silica, it will be understood that my invention is not limited to compositions of this type. Other refractory materials may be substituted for silica. It is also within the scope of my invention to utilize binders other than calcium sulfate if desired.

Although the chlorides which I use to improve the thermal expansion of my investment compound are preferably used in percentages ranging from .1 to 2 per cent, it is within the scope of my invention to use as much as 3.5 per cent of such chlorides.

I have further found that when barium chloride, calcium chloride or magnesium chloride is to be used, as the agent for the control of thermal expansion (as covered in my application Serial No. 54,337), while the preferred amounts of these chlorides are not over 2.0 per cent of the entire weight of the dry investment composition, it is possible to use 3.5 per cent of these chlorides.

It is within the scope of my invention to provide investment compositions having total expansion properties as high as 1.60.

The term "protective reagent" as used herein is intended to cover substances added to the investment composition for preventing injury to embedded and cast metals, as in Patent No. 2,006,733, namely, it is intended to cover the substances so designated in my said patent, except the halides given therein.

Let it be understood that my invention is not limited to use in the dental art, because it will be found equally effective in other arts where investment compositions of this general nature are employed, in kindred casting processes. My invention will work with equal surety in compositions designed for jewelry manufacture, for die casting and ornamental casting wherein it is required that the expansion of such investment composition shall wholly, or in part, compensate for the contraction of the metal to be cast.

What is claimed is:

1. An investment composition for casting precious metals and their alloys, consisting principally of a siliceous refractory material and a calcium sulfate binder in such proportions as to give a dental investment composition and containing from .1 to 2.0 per cent zinc chloride.

2. A dental investment composition containing more than 50 per cent of a siliceous refractory material, a calcium sulfate binder, with the refractory material and the binder so proportioned as to give a dental investment composition and about 2 per cent of zinc chloride.

PAUL FRANCIS COLLINS.